(12) United States Patent
Swanson et al.

(10) Patent No.: US 11,175,197 B2
(45) Date of Patent: Nov. 16, 2021

(54) RESETTABLE OVERPRESSURE INDICATOR FOR AIRCRAFT

(71) Applicant: Tactair Fluid Controls, Liverpool, NY (US)

(72) Inventors: Jeffrey Christopher Swanson, Clay, NY (US); Charles Joseph Fairbanks, Liverpool, NY (US); Michael Rex Obleman, Jr., Cicero, NY (US)

(73) Assignee: Tactair Fluid Controls, Liverpool, NY (US)

( * ) Notice: Subject to any disclaimer, the term of this patent is extended or adjusted under 35 U.S.C. 154(b) by 237 days.

(21) Appl. No.: 16/400,065

(22) Filed: May 1, 2019

(65) Prior Publication Data

US 2019/0339149 A1 Nov. 7, 2019

Related U.S. Application Data

(60) Provisional application No. 62/820,450, filed on Mar. 19, 2019, provisional application No. 62/666,745, filed on May 4, 2018.

(51) Int. Cl.
*G01L 23/02* (2006.01)
*B64D 45/00* (2006.01)

(52) U.S. Cl.
CPC .............. *G01L 23/02* (2013.01); *B64D 45/00* (2013.01)

(58) Field of Classification Search
None
See application file for complete search history.

(56) References Cited

U.S. PATENT DOCUMENTS

| 2,942,572 A | 6/1960 | Pall |
| 4,654,643 A | 3/1987 | Meisenheimer, Jr. |
| 4,745,876 A | 5/1988 | Whiting |

(Continued)

FOREIGN PATENT DOCUMENTS

WO WO 94/01746 1/1994

OTHER PUBLICATIONS

Invitation to Pay Additional Fees and, Where Applicable, Protest Fee and Partial International Search Report and Written Opinion for PCT/US2019/030311; dated Aug. 26, 2019; 11 pages.

(Continued)

*Primary Examiner* — Paul M. West
*Assistant Examiner* — Mark A Shabman
(74) *Attorney, Agent, or Firm* — Barclay Damon LLP

(57) ABSTRACT

An overpressure indicator is defined by a housing sized and configured for attachment within a compartment interior, such as an aircraft nacelle. A pressure sensing element disposed within the housing is coupled to an indicator element and is configured to detect a pressure differential between the interior and exterior of the compartment. The indicator element is caused to move in response to a predetermined change in pressure exceeding a threshold pressure differential. The indicator element includes a distal end that is moved to a position exterior of the housing and the compartment, providing a visual indication of an overpressure condition. A reset feature provided on the indicator can only be accessed by first opening the compartment in which the indicator has been mounted. A spring can be provided to assist in the triggering of the indicator member after the threshold pressure differential has been detected.

17 Claims, 15 Drawing Sheets

(56) References Cited

U.S. PATENT DOCUMENTS

| | | | | |
|---|---|---|---|---|
| 5,237,957 A | * | 8/1993 | Liucci | G01L 19/12 |
| | | | | 116/267 |
| 5,879,544 A | | 3/1999 | Cassidy | |
| 2008/0149772 A1 | * | 6/2008 | Sandiford | B64D 37/005 |
| | | | | 244/135 R |
| 2015/0122354 A1 | | 5/2015 | Mills et al. | |

OTHER PUBLICATIONS

International Search Report and Written Opinion for PCT/US2019/030311; dated Jan. 3, 2020; 20 pages.

* cited by examiner

RESETTABLE OVERPRESSURE INDICATOR FOR AIRCRAFT

CROSS REFERENCE TO RELATED APPLICATIONS

This application claims priority to U.S. Provisional Patent Application Ser. No. 62/820,450, filed Mar. 19, 2019, and U.S. Provisional Patent Application Ser. No. 62/666,745, filed May 4, 2018, which is herein filed pursuant to applicable portions of 35 U.S.C. § 111 and 37 CFR § 1.53. Each of the above-noted applications are incorporated by reference in their entirety.

TECHNICAL FIELD

This application is directed to the field of pressure indicators and more specifically to a resettable indicator that can be used specifically in the aviation field to detect overpressure conditions in an aircraft engine nacelle, but can also be used in other industries having apparatus that are subject to severe environmental conditions.

BACKGROUND

There is a need in the field of aviation to monitor low-level overpressure conditions (e.g., 3 psi above atmospheric pressure) within an aircraft jet engine nacelle. Such overpressure conditions may be caused by a bleed air system burst duct event, which would not be readily apparent to the flight crew or ground personnel upon pre/post flight inspection. Accordingly, there is a corresponding need in the field to provide a device that will trigger a discernible indication when an overpressure condition occurs. It would be preferred to provide a device that attaches to the engine nacelle and when triggered by an overpressure event, will provide a visual indication on the nacelle exterior, alerting the crew during inspection to investigate further.

Such a device would have to reliably function at a low pressure differential with a high degree of accuracy over an extreme range of environmental and aircraft conditions. While device designs are known which can ordinarily trigger/indicate at an indicated pressure differential under nominal environmental conditions, there are a number of issues that arise when this type of indicator needs to perform under a severe range of environmental and aircraft conditions, as listed above.

In addition, the indicator device or apparatus should be resettable, but not so easily resettable by personnel unfamiliar with the function of the device so as to mask the occurrence of an overpressure event or prevent the resulting overpressure condition from being remedied.

BRIEF DESCRIPTION

Therefore and according to one aspect, there is provided a passive pressure or overpressure indicator apparatus comprising a housing or body configured for attachment within the interior of a compartment. The indicator apparatus is configured with access to the exterior of the compartment for atmospheric pressure and an indicator feature provides an indication of a sensed pressure differential within the compartment. The indicator apparatus includes at least one pressure sensing element in which the sensed pressure differential between the interior and exterior of the compartment exceeding a predetermined threshold triggers the indicator feature.

In one embodiment, the pressure sensing element is a diaphragm, preferably made from a high temperature resistant material. In one version, a pair of magnets are provided in spaced relation on opposing sides of the diaphragm with the magnets being initially set at a predetermined distance from one another to create an attractive force therebetween. A change in detected pressure differential in the compartment that exceeds a predetermined threshold value causes the diaphragm to expand, displaces the magnets and triggers or otherwise deploys the indicator feature. In at least one version, the indicator feature is a post or pin member having a distal end that is caused to "pop-out" of the compartment based on a detection of the threshold pressure differential. In at least one version, the post or pin member is biased by a light spring. In another version, a spring can be provided to assist the deployment or triggering of the indicator feature. In a preferred version, the indicator is mounted within a compartment with the indicator feature extending out of the compartment. Accordingly, the indicator feature cannot be reset unless both magnets are moved back to their initial or home position, thereby requiring reset of opposing pin members provided on the device at both the inside and outside of the compartment. The indicator apparatus can be adjusted, for example, by controlling the air gap between the pair of magnets in the normal position.

According to another version, the pressure sensing element can be a metallic bellows which works in concert with a sensed pressure differential between the interior of a compartment and atmosphere to expand or actuate an indicator feature from the indicator device. The apparatus is mounted within the compartment and ported to atmosphere wherein the bellows acts as a spring energized actuator inside the compartment (e.g., aircraft nacelle), and strokes an indicator post outward due to the pressure differential between the interior of the compartment and atmosphere. The indicator apparatus according to this version has the ability to be adjusted to move a certain distance at a required trip pressure. Once met, a spring-energized reset pin or other locking member accessible in the interior of the compartment engages the indicator feature, keeping the apparatus in the tripped position after the pressure differential returns to normal. As such, reset of the indicator feature is prevented until the compartment is first opened.

For use on an aircraft engine nacelle, the herein described indicator apparatus needs to function at a low pressure differential with a high degree of accuracy (3 psid+/−0.2 psi) over an extreme range of environmental and aircraft conditions as follows:

atmospheric pressure at altitudes between −2,000 to 41,500 ft
operational temperatures: −54° to 400° C.
Environmental exposures (fluid susceptibility, sand/dust, salt spray, icing)
aircraft speed (up to 270 m/sec)
aircraft vibration between 5 and 5000 Hz Additionally, the indicator apparatus should be configured in order to permit periodic function and calibration checks as well as adjustment/tuning.

The herein described indicator apparatus utilizes high temperature performance materials which can operate within a large temperature operating range and minimize pressure sensing variations. According to one version, the pressure sensitive element (e.g., diaphragm or metallic bellows) can be made from Inconel.

Preferably, the indicator apparatus utilizes a tortuous path atmospheric vent and seat-sealing indicator post approach which addresses issues including fluid susceptibility, sand and dust, salt spray and icing, among others.

The herein described indicator apparatus is sized/designed to withstand air speed drag forces on the indicator posts.

Moreover, the indicator apparatus preferably utilizes air passage restriction, which meters air flow to the diaphragm and bellows chambers allowing them to act as air dampers, thereby alleviating vibration issues.

One advantage provided is that the herein described indicator apparatus passively and reliably provides an overpressure indicator in spite of extreme ranges in temperature, atmospheric pressure, vibration as well as severe environmental conditions including high humidity, accumulation of icy fluids, and the like.

Another advantage provided is that the herein described indicator apparatus can be adjusted at the time of assembly, as well as at periodic intervals in order to tune the apparatus to a required pressure differential.

The herein described indicator apparatus is responsive to low pressure deltas (i.e., pressure differentials).

These and other features and advantages will be readily apparent from the following Detailed Description, which should be read in conjunction with the accompanying drawings.

DETAILED DESCRIPTION

The following description relates to various embodiments of an overpressure indicator apparatus for use in aircraft and more particularly to detecting a burst duct in an aircraft jet engine nacelle. It will be readily understood, however, that the inventive aspects discussed are well suited for other applications. In addition and throughout the course of discussion, several terms are used such as "upper", "lower", "above", "distal", "proximal", "upwardly", "downwardly", "below", "interior", "exterior" and the like in order to provide a suitable frame of reference in regard to the accompanying drawings. These terms are not intended to be overly limiting, except where so specifically indicated. In addition, the accompanying drawings are intended to show the salient features of the invention, but the reader should not rely upon the drawings for scaling purposes.

Figure 1:
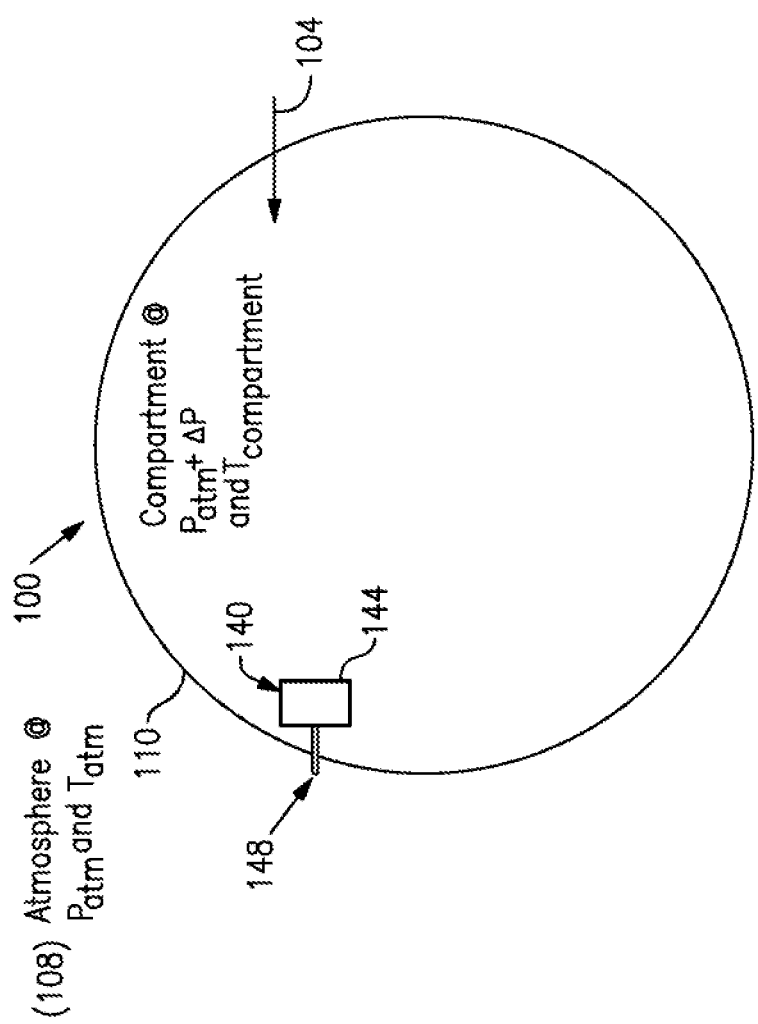
FIG. 1 depicts a schematic view of a compartment that is configured with an overpressure indicator apparatus in accordance with aspects of the invention.

First and with reference to FIG. 1, there is schematically shown a compartment 100 such as, for example, that found in an aircraft jet engine nacelle. The compartment 100 defines an interior space or volume 104 in which the exterior 108 of the compartment 100 is at atmospheric pressure and temperature while the interior space 104 of the compartment 100 is typically subject to atmospheric pressure and temperature in addition to a delta pressure, which may be caused by a burst vent or other anomaly.

An overpressure indicator (also referred throughout as an indicator apparatus) in accordance with aspects of the present invention, herein labeled generically as 140, has a body or housing 144 that is attached to an interior wall 110 of the compartment 100 by conventional means, wherein the indicator apparatus 140 is provided with a visual indicator feature 148 that is tripped when a predetermined pressure differential is realized (delta P) within the compartment 100. The visual indicator feature 148, as discussed herein, can be a pin, a post, a lever, or other similar member having at least one portion or end that can be caused to extend outside the compartment 100. In operation, atmospheric pressure from the exterior 108 of the compartment 100 is ported into the housing 144 of the indicator apparatus 140, as well as air from the interior 104 of the compartment to commonly act upon a pressure sensing element disposed within the housing 144.

Figure 3:
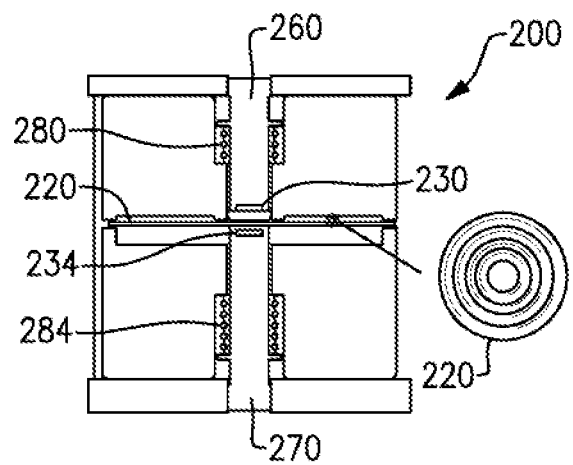
FIG. 3 is a side elevational view of an overpressure indicator apparatus in accordance with another embodiment.
Figure 4:
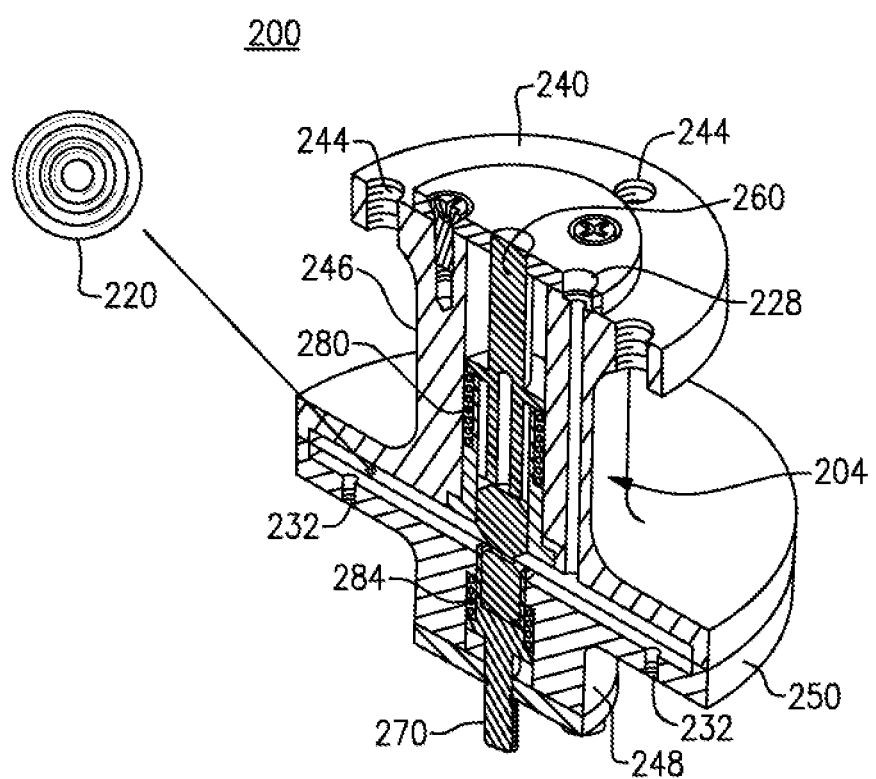
FIG. 4 is a sectioned perspective view of the overpressure indicator apparatus of FIG. 3.
Figure 5A:
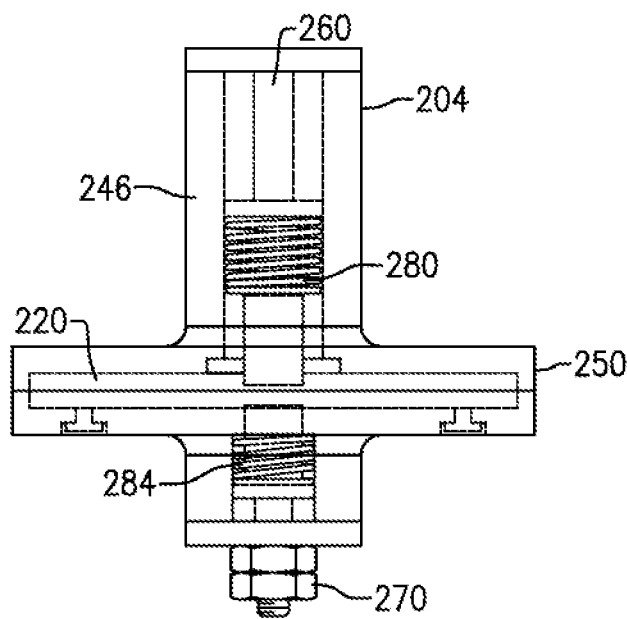
FIGS. 5(a) and 5(b) are partially sectioned views of the overpressure indicator apparatus of FIGS. 3 and 4 as shown in normal and tripped conditions, respectively.
Figure 5B:
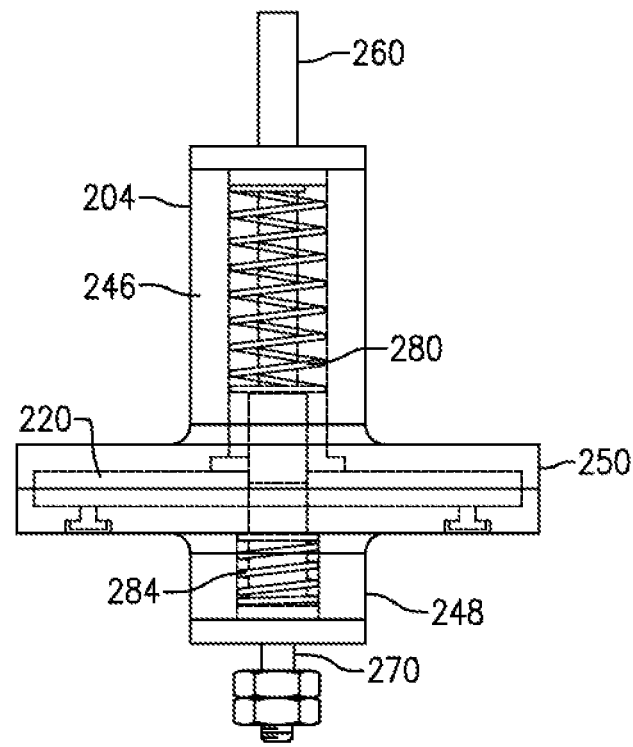

With reference to FIGS. 3-5(b), an overpressure indicator or indicator apparatus 200 in accordance with a first embodiment is described. The indicator apparatus 200 is defined by a body or housing 204 that is configured to be mounted to the interior wall (not shown) of a compartment (not shown), such as an aircraft jet engine nacelle. Disposed within the housing 204 is a pressure sensing element, which according to this embodiment, is a flexible diaphragm 220. According to one version, the diaphragm 220 is made from Inconel, although other suitable materials that exhibit high temperature resistant properties could also be utilized. The housing depicted in FIG. 3 is intended to show a schematic operation of the overpressure indicator apparatus 200 while the housing 204 shown in FIGS. 4, 5(a) and 5(b) depicts an exemplary design.

The housing 204 includes an upper flange 240 that permits the indicator apparatus 200 to be mounted to the interior wall (not shown) of the compartment using a plurality of mounting holes 244 using fasteners (not shown). The housing 204 includes an upper necked portion 246 and a lower necked portion 248 according to this embodiment, but it should be noted that the housing 204 can also assume other convenient shapes and configurations. Between the upper and lower necked portions 246, 248 is an intermediate portion 250 within which the diaphragm 220 is disposed.

With reference to FIGS. 3-5(b), the overpressure indicator apparatus 200 further includes a pair of magnets 230, 234 disposed on opposing sides of the flexible diaphragm 220. The magnets 230, 234 are placed at an initial distance from each other so as to create an attractive force. One of the magnets 230 is configured in relation to a retained pin, post or similar indicator member 260 disposed within an axial cavity formed in the upper necked portion 246 of the housing 204 that can be deployed outward of the housing 204 when the magnets 230, 234 have moved a predetermined distance away from each other due to the deflection of the diaphragm 220. When this occurs, the indicator member 260 is released into an outward or tripped position, as biased by a spring 280. According to this embodiment, a corresponding reset member 270 is disposed in an axial cavity formed in the lower necked portion 248 of the housing 204 and configured in relation to the remaining magnet 234. Each of the indicator and reset members 260, 270 are supported in the upper and lower necked portions 246, 248 of the housing 204 and biased in a released or tripped position by springs 280, 284, respectively.

Atmospheric pressure from the exterior of the compartment is ported through the device housing 204 via a defined passage 228 formed in the upper necked portion 246 of the housing leading to the diaphragm 220 as supported within the intermediate portion 250 of the housing 204. Similarly, the internal pressure of the compartment is also ported into the housing 204 to the opposite side of the diaphragm 220 thorough at least one similar passage 232 formed in the intermediate portion 250 of the housing 204. According to this embodiment, a pair of passages 232 are provided, although the actual number of passages can be suitably varied. Additionally, the above passages 228, 232 preferably utilize an air metering component in order to meter air flow to the diaphragm 220 allowing the passages to act as air dampers, and thereby alleviating vibration issues that can dampen vibration inputs to the indicator apparatus 200.

In operation and when the pressure within the compartment exceeds a predetermined trip threshold level (e.g., 3 psi above atmospheric pressure), the pressure differential inside the compartment causes the diaphragm 220 to deflect or expand. This expansion causes the distance between the magnets 230, 234 to be increased, thereby reducing the attraction forces between the magnets 230, 234.

As the distance between the pair of magnets 230, 234 increases, the indicator member 260 is caused to be extended outwardly from the exterior of the housing 204 and the exterior of the compartment based on the release of the biasing spring 280 after the magnet 230 has advanced a predetermined axial distance, thereby indicating the overpressure condition within the compartment. According to this embodiment, the opposing reset member 270 is also axially advanced outward of the housing 204 and released in a biased state based on the spring 284, as shown in FIG. 5(b).

The indicator member 260 of the herein described apparatus 200 can be reset, but it is desired that the resetting operation not be completed prematurely before inspections are first performed. As such and according to this described embodiment, resetting can be performed but not without requiring both the indicator member 260 and the opposing reset member 270 be acted upon simultaneously in order to restore the attractive force between the magnets 230, 234 and requiring access to the interior of the compartment for a resetting of the apparatus 200, as shown in FIG. 5(a). Accordingly, this resetting operation requires access to the interior of the compartment, wherein mere access to the extending part of the indicator member 260 alone is not sufficient.

Figure 2A:
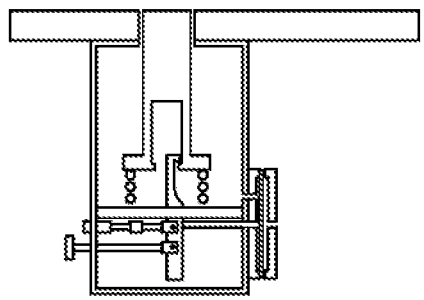
FIGS. 2(a)-2(c) are side elevational views, taken in section, of an overpressure indicator apparatus having a diaphragm as a pressure sensing element that is used for triggering a pressure differential in accordance with various embodiments of the invention.
Figure 2B:
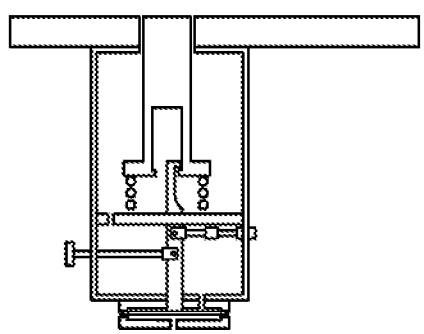
Figure 2C:
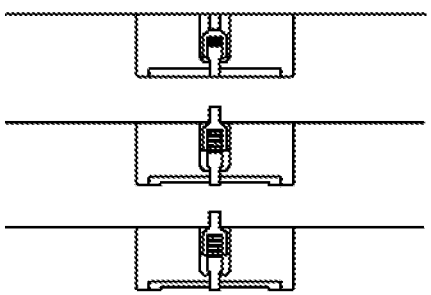

The foregoing design is dependent on the use of a pressure sensing element that is deflected under a pressure load in order to trigger or deploy the indicator feature of the device. It should be understood that the position of the actual trigger can be suitably varied, as shown at the side or bottom of a representative housing, respectively, FIGS. 2(a) and 2(b), or in the positions shown in FIG. 2(c).

In accordance with another embodiment and with reference to FIGS. 6-8(b), there is provided an overpressure indicator or indicator apparatus 400. In this described embodiment, a metallic bellows 406 is used as a pressure sensing element. The bellows 406 is preferably made from a high temperature resistant metal such as Inconel, although other suitable materials can be utilized. First and referring to FIG. 6, an operational schematic view is provided of the overpressure indicator 400. As shown, the indicator apparatus 400 includes a housing 402, FIG. 7, with one end of the bellows 406 being fixedly secured to a lower plate 410 and the opposite end of the bellows 406 being secured to a flange 415 formed as part of an upper section 419 of the indicator 400. Within the upper section 419 is a venting passage 424, as well as a through opening or cavity 425 that is sized and shaped to receive a indicating member 430, which can be formed as a pin, post or having a similar structure.

Figure 6:
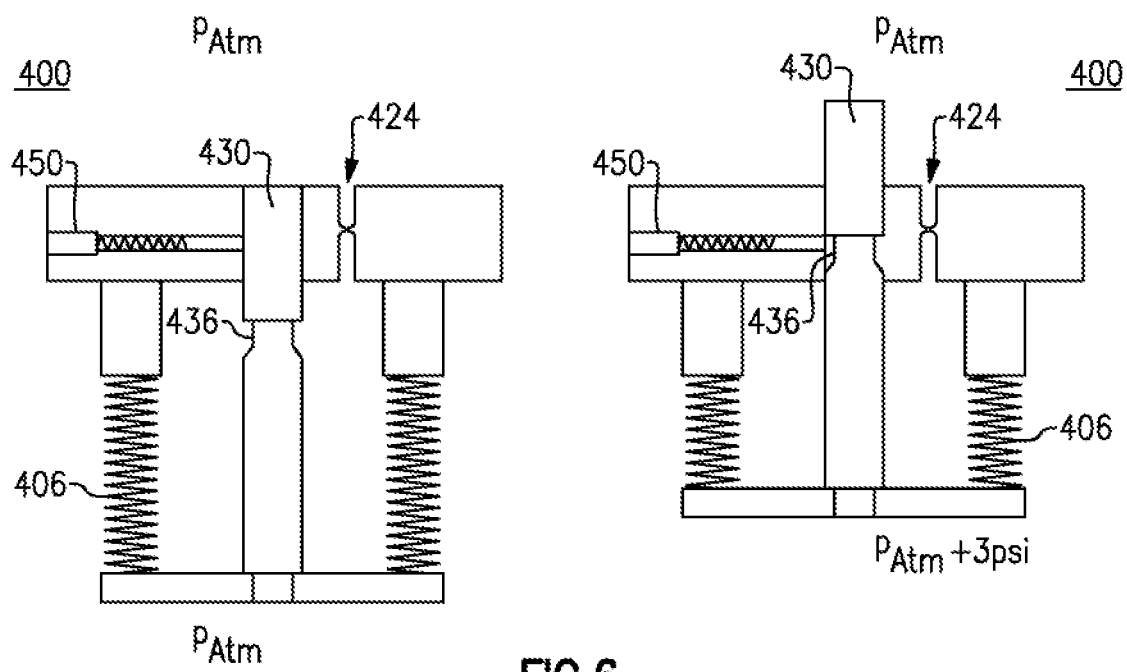
FIG. 6 depicts normal and tripped views of an overpressure indicator apparatus made in accordance with yet another embodiment in which a metallic bellows is used as a pressure sensing element.
Figure 7:
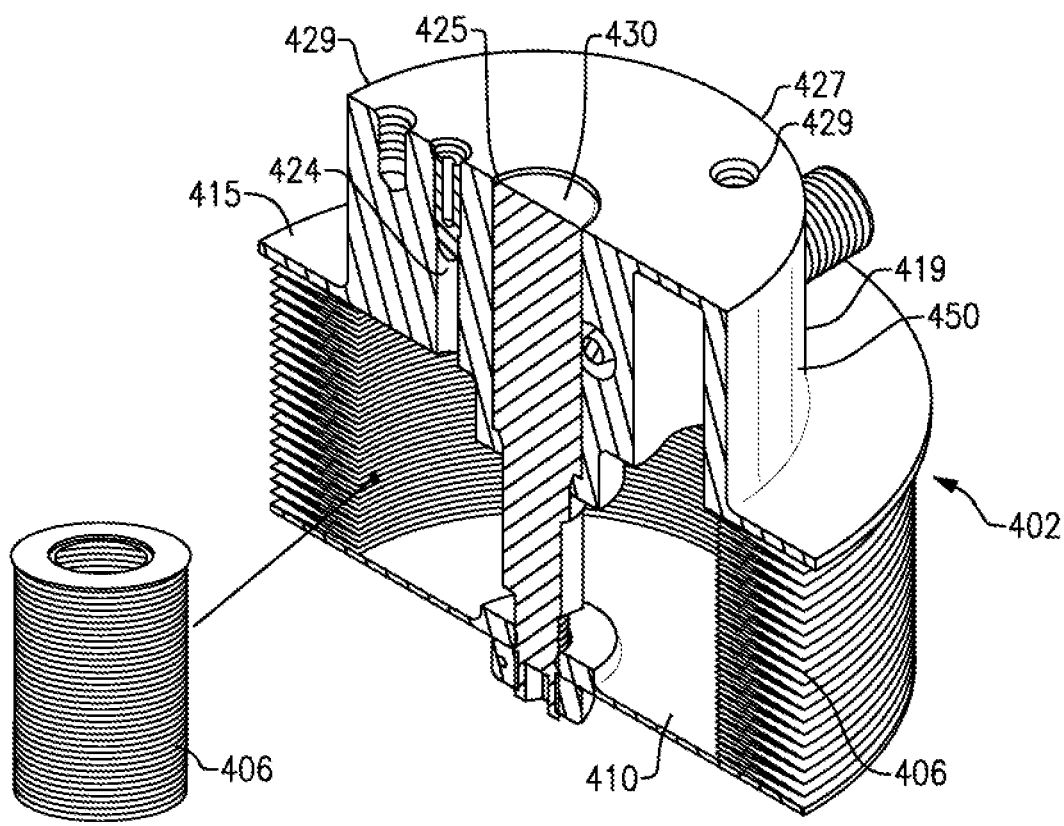
FIG. 7 is a sectioned perspective view of the overpressure indicator apparatus of FIG. 6.

As most clearly shown in FIG. 6, the venting passage 424 preferably utilizes an air metering component that can restrict and meter air flow to the bellows chambers allowing the passage to act as an air damper, thereby alleviating vibration issues. The top surface 427 of the upper section 419 includes a plurality of mounting holes 429. As schematically shown in FIG. 1, the apparatus 400 is configured for attachment to the interior wall of a compartment.

Figure 8A:
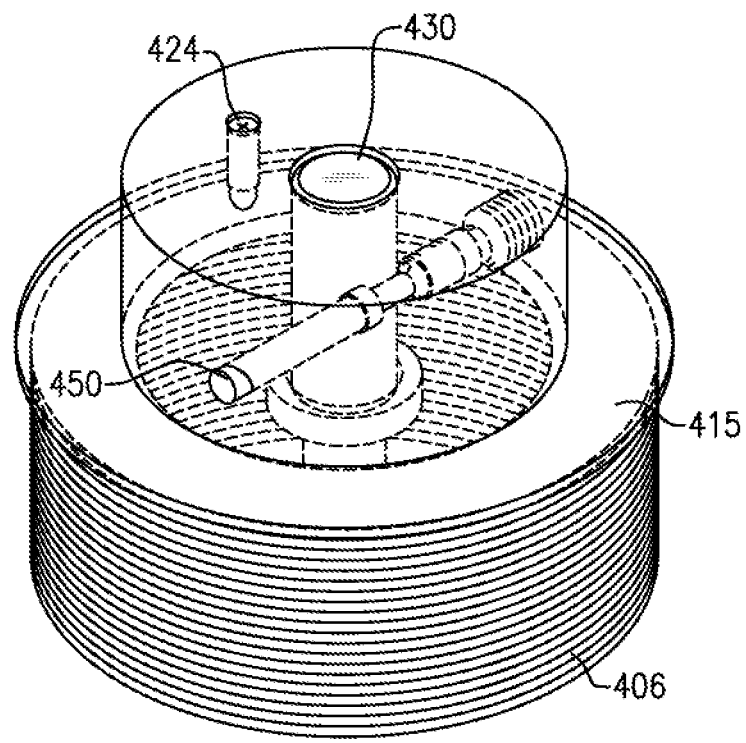
FIGS. 8(a) and 8(b) are partial perspective views of the overpressure indicator apparatus of FIGS. 6 and 7, depicting respective normal and tripped positions, respectively.

Initially, the indicator apparatus 400 is in a "normal" condition, as shown in FIG. 8(a) in which the bellows 406 is extended between the flange 415 and the lower plate 410. As the pressure inside the compartment increases and reaches a predetermined pressure differential (e.g., about 3 psid), the bellows 406 is compressed and the indicator member 430 is caused to extend outwardly from the housing 402 and from the compartment. As the indicator member 430 is advanced axially to the tripped position of FIGS. 6 and 8(b), a recessed portion 436 of the indicator member 430 is caused to receive one end of a biased and transversely mounted reset member 450 that extends through the housing 402. The sectioned view of FIG. 6 and FIGS. 8(a) and 8(b) depicts the indicator 400 in respective normal (untripped)

and tripped conditions. As shown schematically in FIG. 6, a rise in pressure in the compartment relative to the exterior of the compartment causes the bellows 406 to compress, which engages the attached indicator member 430 and forces the distal end 431 of the indicator member 430 outward of the apparatus 400 and the compartment.

Figure 8B:
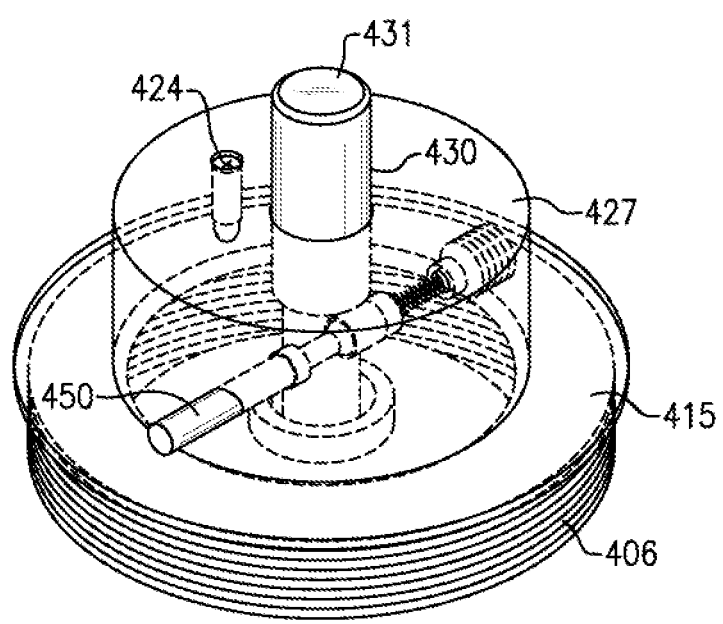

Only the distal end 431 of the indicator member 430 extends outwardly of the housing 402, as most clearly shown in FIG. 8(b). Because the resetting feature is located on the mounted housing 402, the transversely mounted reset member 450 cannot be accessed without first opening the compartment and pulling the opposite end of the reset member 450, the latter being preferably biased into the reset position by a compression spring (not shown).

Figure 9A:
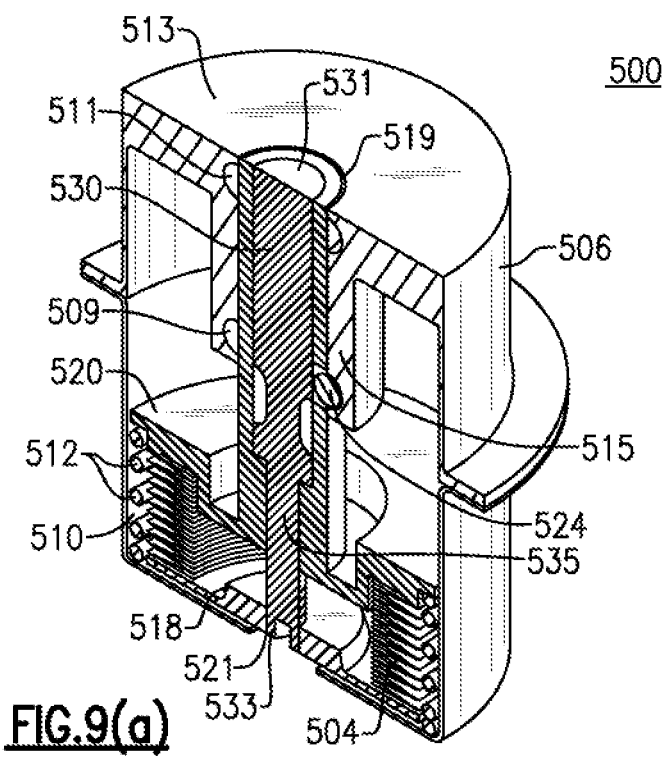
FIG. 9(a) is a perspective sectioned view of an overpressure indicator apparatus made in accordance with another embodiment.
Figure 9D:
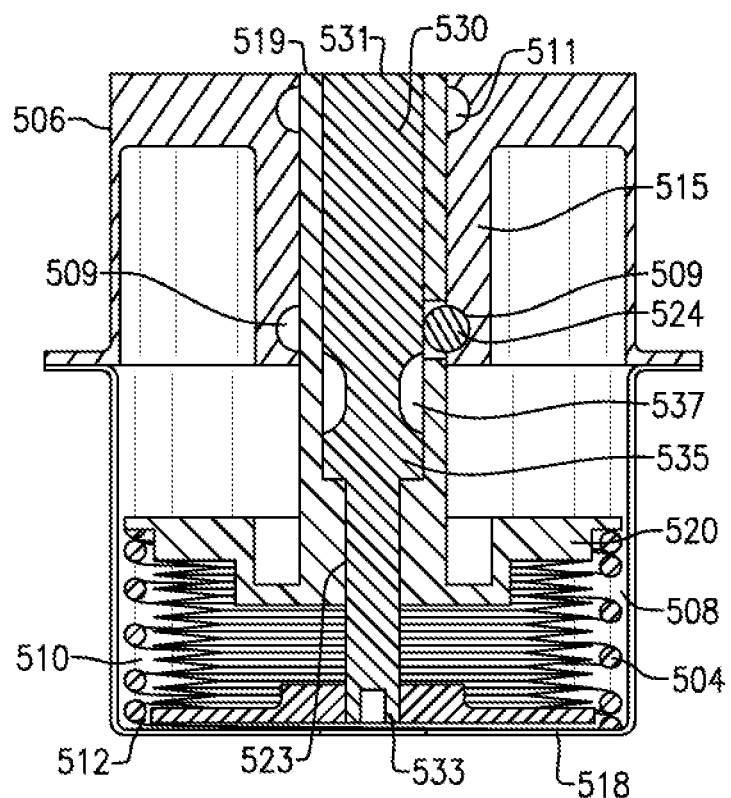
FIG. 9(d) is another sectioned view of the overpressure indicator apparatus of FIGS. 9(a)-(c).
Figure 9B:
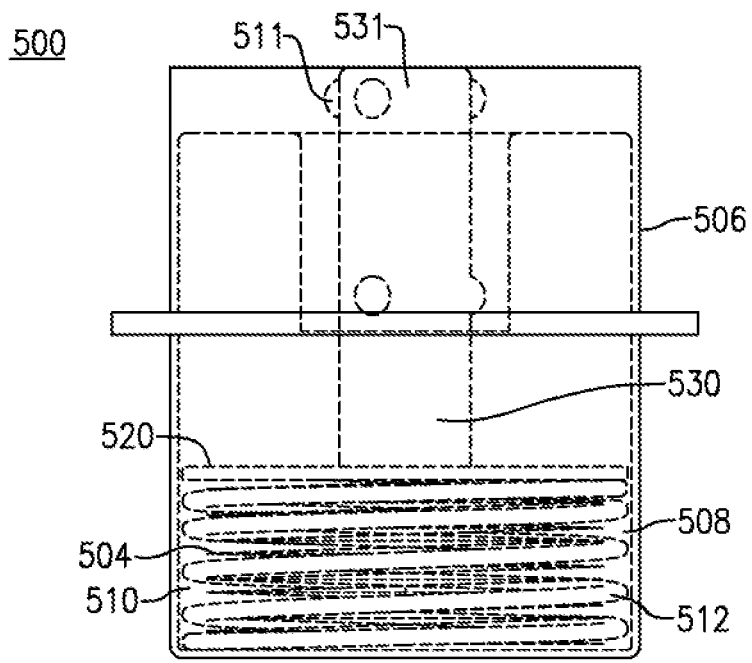
FIGS. 9(b) and 9(c) are partially sectioned views of the overpressure indicator apparatus of FIG. 9(a), depicting normal and tripped positions, respectively.
Figure 9C:
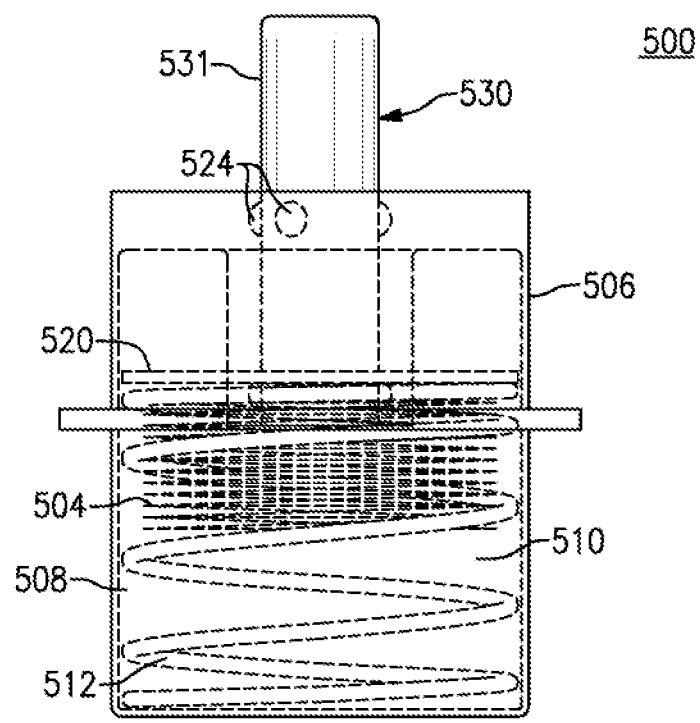

Variations can be made to this latter bellows-actuated overpressure indicator apparatus design. For example and with reference to FIGS. 9(a)-9(d), there is provided another overpressure indicator or indicator apparatus 500 that employs a bellows 504 as a pressure sensing element. As in the previously described version, the bellows 504 is preferably made from a high-temperature resistant metal, such as Inconel, and is disposed within a lower chamber 510 of an indicator housing 506. According to this version, an assist spring 512 is disposed about the metallic bellows 504. For purposes of this embodiment, the assist spring 512 is used to further promote the axial deployment of an indicator member 530 when the pressure in the lower chamber 510 of the housing 506 exceeds a predetermined or threshold pressure differential relative to the exterior of the compartment (i.e., atmospheric pressure) within which the apparatus 500 is mounted. With reference to FIGS. 9(a), 9(c) and 9(d), the lower chamber 510 is defined by a movable interior plate 520 having an outer diameter sized and configured to engage an inner interior surface 508 of the indicator housing 506. The lower chamber 510 is further defined by a fixed bottom plate 518 of the housing 506, wherein the bellows 506 and assist spring 512 are disposed between the fixed bottom plate 518 and the movable interior plate 520, with the assist spring 512 being disposed initially in a compressed state.

The housing 506 further includes a top surface 513 having a cylindrical flange 515 extending downwardly into the interior of the housing 506. The top surface 513 and cylindrical flange 515 are further defined by a center opening 519 that is aligned with a center opening 521 formed in the fixed bottom plate 518 and an opening 523 formed in the movable interior plate 520. The indicator member 530 according to this embodiment is defined by a post-like section having opposing distal and proximal ends 531, 533, respectively. The proximal end 533 of the indicator member 530 is accessible through the center opening 521 formed in the fixed bottom plate 518, with the distal end 531 of the indicator member 530 extending through the aligned center opening 519 formed in the top surface 513 and downwardly extending flange 515 of the housing 506. An intermediate axial portion 535 of the indicator member 530 is fixedly attached within the aligned center opening 523 formed within the movable interior plate 520. Immediately above the intermediate axial portion 535 is a necked portion 537.

According to this embodiment, a plurality of ball bearings 524 are disposed in spaced circumferential relation above the movable interior plate 520, and more specifically within an annular groove 509 formed on the interior of the center opening 519 at a lower end of the downwardly extending flange 515. According to this embodiment, three (3) ball bearings 524 are used, but this number can be suitably varied. Alternatively, a series of recesses could be provided in lieu of the annular groove 509, provided the groove/recesses are sized to partially retain the ball bearings with a portion of each supported ball bearing 524 extending into the center opening 519 of the downwardly extending flange 515. A similar annular groove 511 (or set of circumferentially spaced recesses) is formed at an upper end of the flange 515 adjacent the top surface 513 of the housing 506.

In terms of operation, the apparatus 500 is mounted within a compartment, such as an aircraft engine nacelle. Air from the exterior of the compartment is ported to the lower chamber 510, while air within the compartment is similarly directed to the interior of the housing 506. When a predetermined pressure differential occurs in which the interior pressure sufficiently exceeds the pressure exterior to the compartment (atmospheric pressure), the contained bellows 504 is caused to contract. This contraction results in contractive movement between the movable interior plate 520 and the indicator member 530, of which the indicator member 530 and the bottom plate 518 are caused to initially move upwardly according to this embodiment, as shown in FIG. 9(b).

As the indicator member 530 and attached bottom plate 518 move upwardly due to the contraction of the bellows 504, the ball bearings 524 are displaced from the lower annular groove 509 into the necked portion 537 of the advancing indicator member 530. This latter movement unlocks the apparatus 500 and releases the compressed assist spring 512 to push the entire subassembly, including the indicator member 530, movable interior plate 520, bellows 504, bottom plate 518 and ball bearings 524 upwardly, enabling the indicator member 530 to reach the tripped position, as shown in FIG. 9(c) in which the distal end 531 of the indicator member 530 is caused to extend outside of the indicator housing 506 and the compartment, alerting an inspector to an overpressure condition. When in the tripped condition, the ball bearings 524 are retained by the upper annular groove 509 formed in the downwardly extending flange 515. The bottom surface of the cylindrical flange 515 provides a mechanical stop for preventing further upward movement of the movable interior plate 520 and the assist spring 512.

According to this embodiment, the sensitivity of the bellows 504 and the preload of the assist spring 512 can be suitably adjusted. A threaded connection is provided between the indicator member 530 and the movable interior plate 520 in which the proximal end 533 of the extending indicator member 530 is accessible via the center opening 521. The proximal end 533 can be provided with an interface (e.g., a slot) to enable adjustment using a screwdriver or other tool.

As noted and when tripped as shown in FIG. 9(c), the distal end 531 of the indicator member 530 and movable interior plate 520 extends outside of the indicator housing 506 and the compartment (e.g., nacelle) in which the indicator apparatus 500 is mounted, thereby providing a visual indication of the overpressure condition. To reset the indicator apparatus 500 and according to this embodiment, the compartment must first be opened to enable access to the apparatus 500. The protruding end of the interior plate 520 is pushed inwardly, while a simultaneous action is initiated relative to the contained bellows 506 by pushing the proximal end of the indicator member 530, which releases the ball bearings 524 from the upper retaining groove 511 and into the necked portion 537 of the indicating member 530. The indicating member 530 is pushed inwardly until the ball bearings 524 are again seated in the lower retaining groove 509, restoring the indicator apparatus 500 to its initial or normal position, shown in FIGS. 9(a), (b) and 9(d).

A variation of the preceding embodiment is herein discussed with reference to FIGS. 10(a)-10(d). According to this version, an overpressure indicator or indicator apparatus 600 is defined by a housing 606 having an interior that is sized and configured to retain a plurality of components. The housing 606 is attached by suitable means such as fasteners, to an interior wall of a compartment (not shown), such as an aircraft jet engine nacelle.

A lower chamber 610 formed within the interior of the indicator housing 606 is defined by a movable lower plate 620, a fixed upper portion 650 and a bellows 604. As in the preceding described versions, the bellows 604 is preferably made from a high temperature resistant metal, such as Inconel. The movable lower plate 620 is disposed in relation to the bottom side of the housing 606 and has an outer diameter sized and configured to engage an interior surface 608 of the housing 606. The movable interior plate 620 includes a center through opening 621 that is suitably sized to receive an adjustment member 640, as described below.

The adjustment member 640 is defined by opposing proximal and distal ends 642, 644. The proximal end 642 of the adjustment member 640 includes a series of external threads 645 provided over an axial portion thereof that are configured to engage with corresponding threads (not shown) provided in the center through opening 621 of the movable interior plate 620. This threaded connection provides secure fixed mounting and further enables the sensitivity of the bellows 604 to be adjusted. The distal end 644 of the adjustment member 640 extends upwardly into an aligned center through opening 652 of the fixed upper portion 650. The adjustment member 640 is mainly hollow and defined by an inner cavity that is sized and configured to support an indicator member 630, as well as the assist spring 612.

According to this embodiment, the indicator member 630 is a post-like member that includes respective distal and proximal ends 631, 633 in which the proximal end 633 of the indicator member 630 is placed in contact with one end of the assist spring 612. The opposing end of the assist spring 612 engages the bottom of the inner cavity of the adjustment member 640.

Within the fixed upper portion 650 of the apparatus 600 is an annular groove 657. The indicator member 630 further includes a necked portion 637 adjacent its proximal end 633 that initially supports a plurality of circumferentially spaced ball bearings 660. According to this embodiment, three (3) ball bearings 660 are used, but this number can be suitably varied. The necked portion 637 is initially below and adjacent the annular groove 657, as shown in FIG. 10(b). The adjustment member 640 contains radial holes, which also support the plurality of circumferentially spaced ball bearings 660, and at rest constrains the indicator pin 630 to the adjustment member 640.

A reset mechanism includes a locking or reset member 670. According to this embodiment, the locking or reset member 670 is a pin extending through a transverse opening formed in the upper fixed portion 650 of the indicator apparatus 600. The pin is defined by a circular cross section, with the exception of a machined flat 678 extending over a portion of its length adjacent the center opening 652 of the upper fixed portion 650. A torsion spring 682 contained in the transverse opening biases the machined flat 678 away from the center opening 652.

Figure 10A:
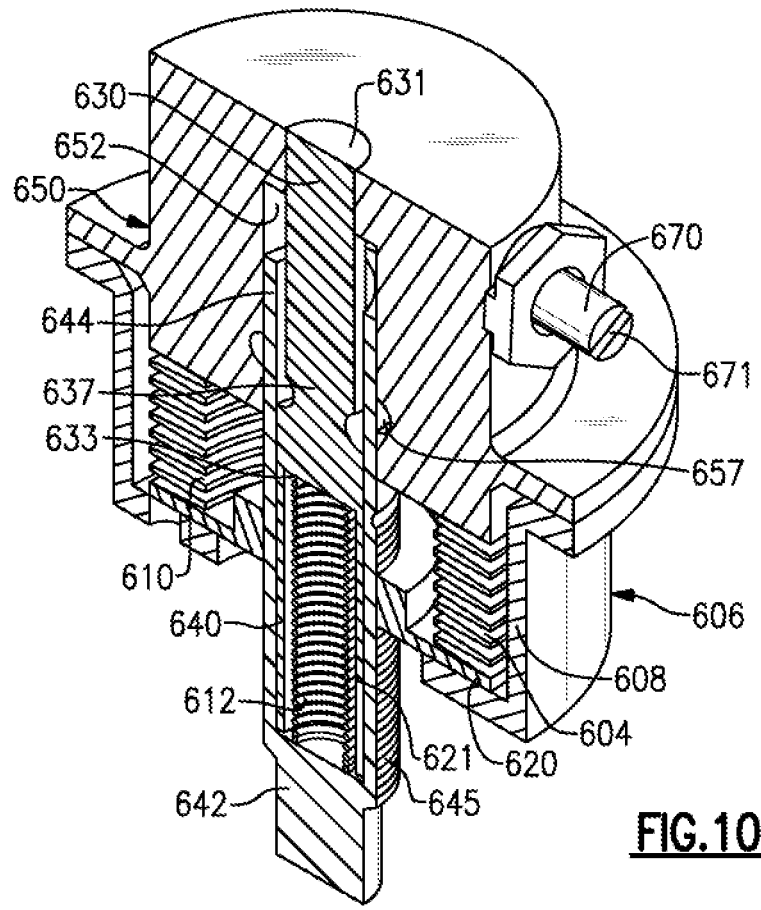
FIG. 10(a) is a perspective sectioned view of an overpressure indicator apparatus made in accordance with yet another embodiment.
Figure 10D:
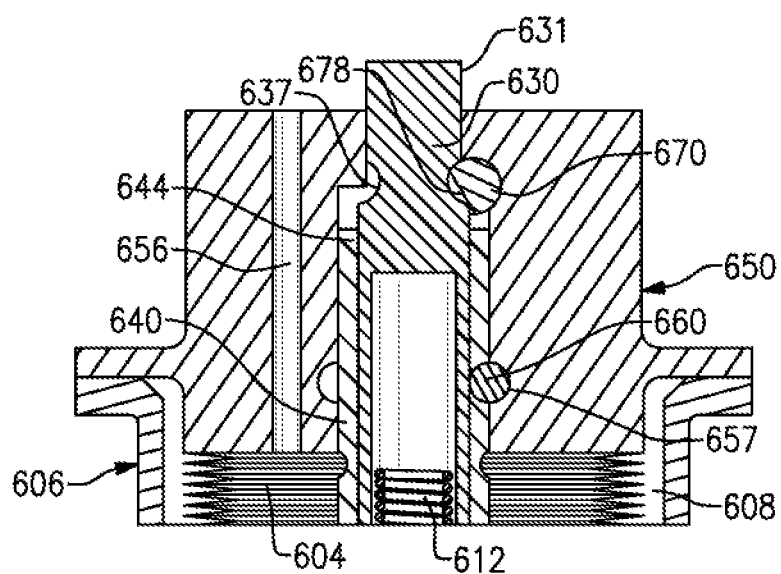
FIG. 10(d) is another sectioned view of the overpressure indicator apparatus of FIGS. 10(a)-(c)
Figure 10B:
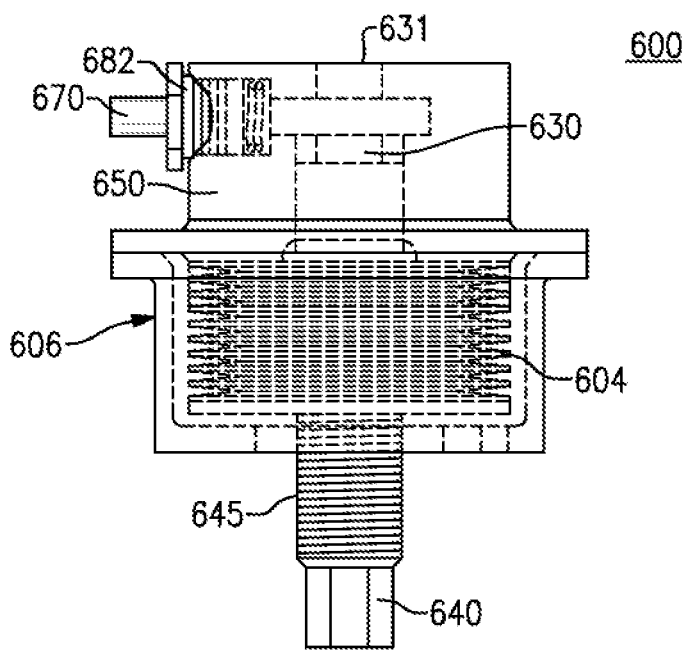
FIGS. 10(b) and 10(c) are partially sectioned views of the overpressure indicator apparatus of FIG. 10(a), depicting normal and tripped positions, respectively.
Figure 10C:
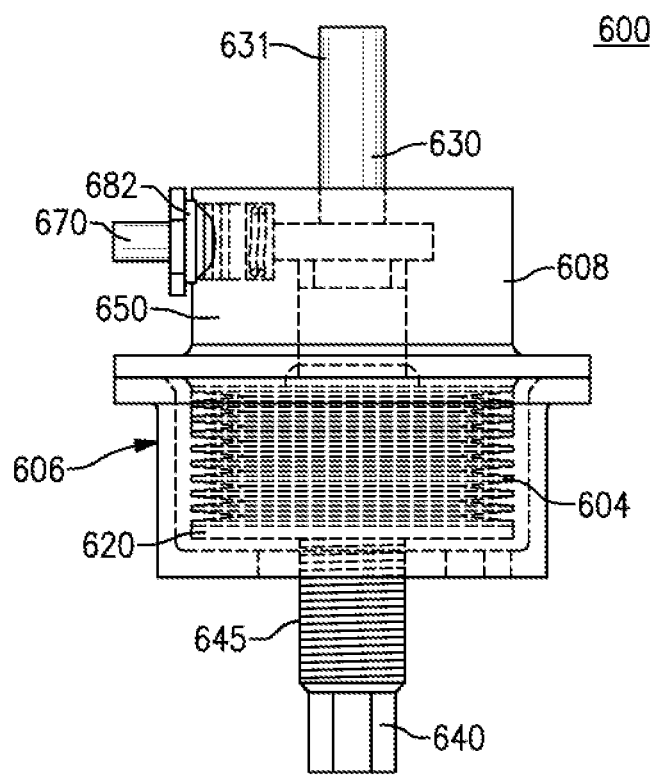
Figure 11A:
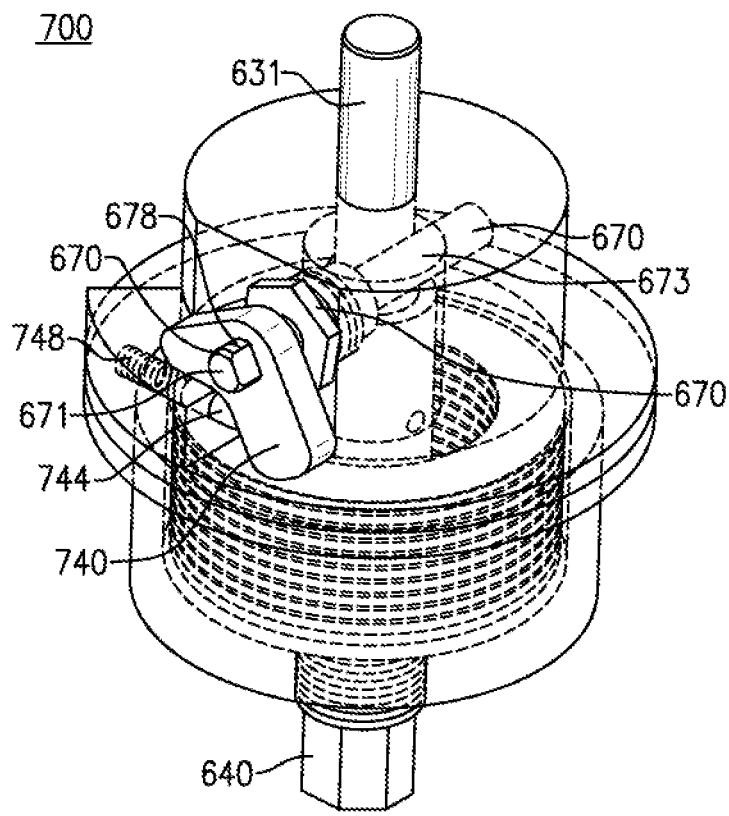
FIG. 11(a) is a perspective sectioned view of an overpressure indicator apparatus made in accordance with another embodiment.
Figure 11D:
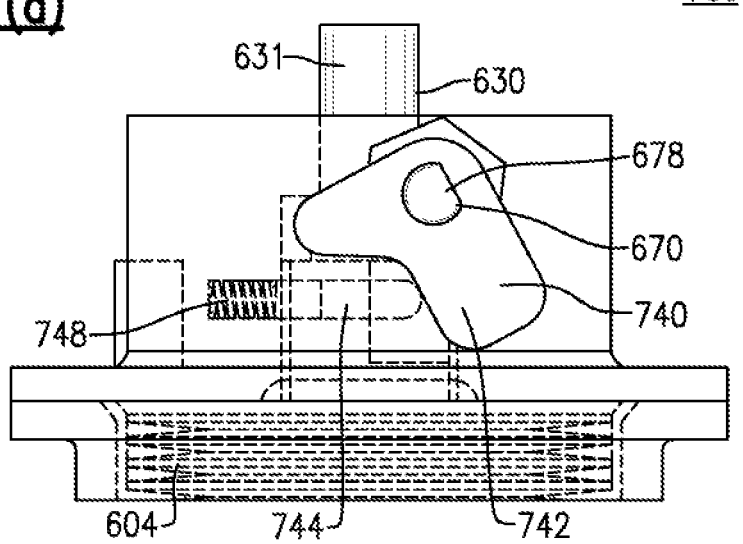
FIG. 11(d) is another sectioned view of the overpressure indicator apparatus of FIGS. 11(a)-(c)
Figure 11B:
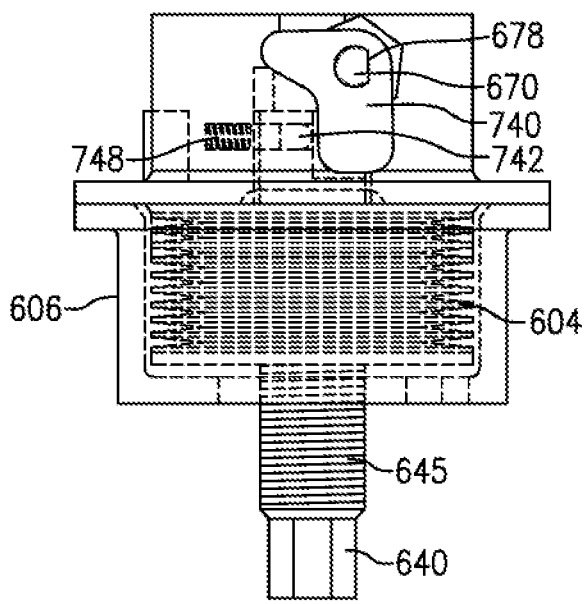
FIGS. 11(b) and 11(c) are partially sectioned views of the overpressure indicator apparatus of FIG. 11(a), depicting normal and tripped positions, respectively.
Figure 11C:
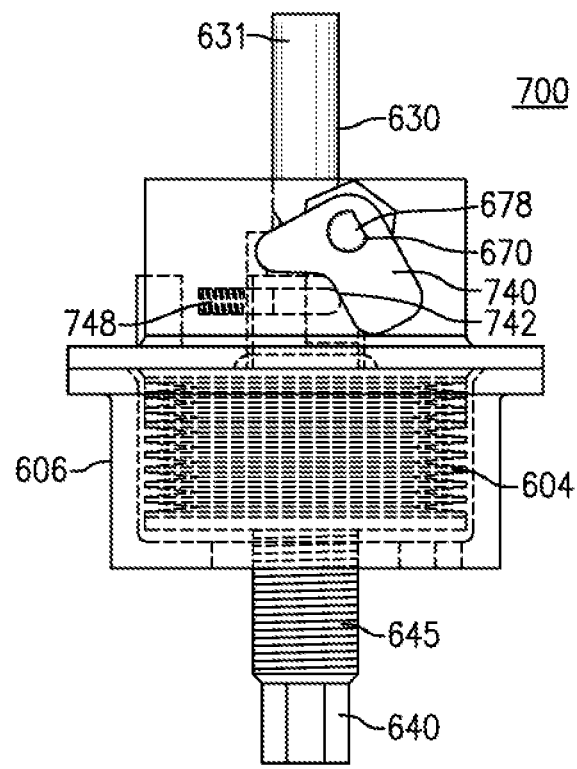
Figure 12A:
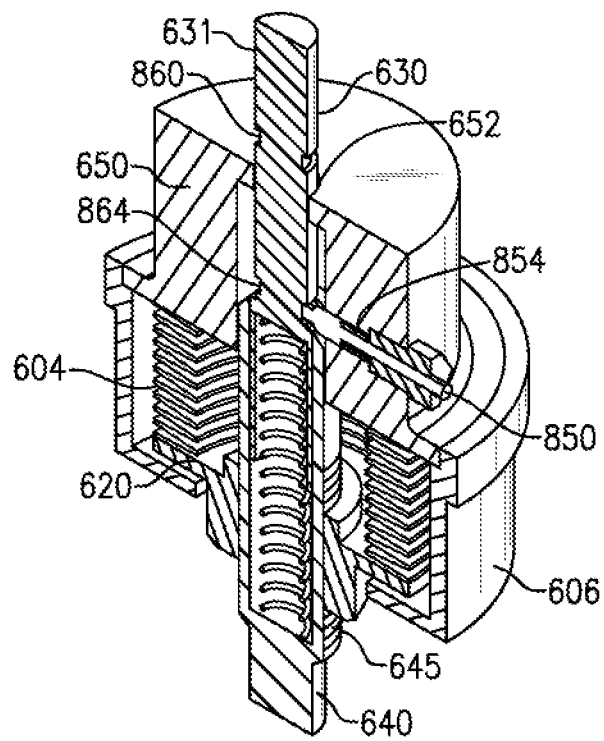
FIG. 12(a) is a perspective sectioned view of an overpressure indicator apparatus made in accordance with another embodiment.
Figure 12D:
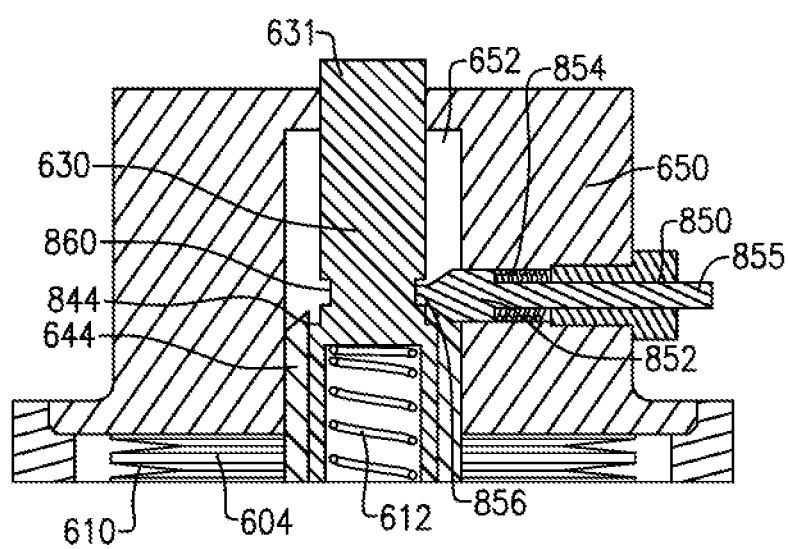
FIG. 12(d) is another sectioned view of the overpressure indicator apparatus of FIGS. 12(a)-(c).
Figure 12B:
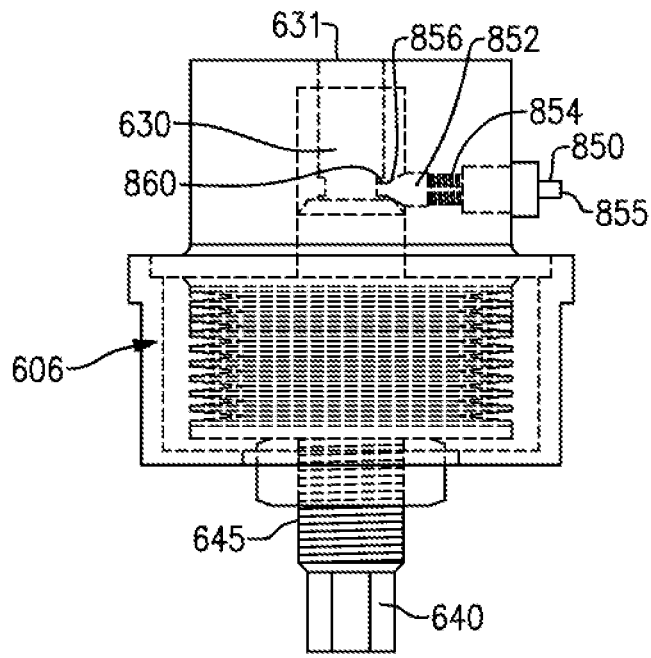
FIGS. 12(b) and 12(c) are partially sectioned views of the overpressure indicator apparatus of FIG. 12(a), depicting normal and tripped positions, respectively.
Figure 12C:
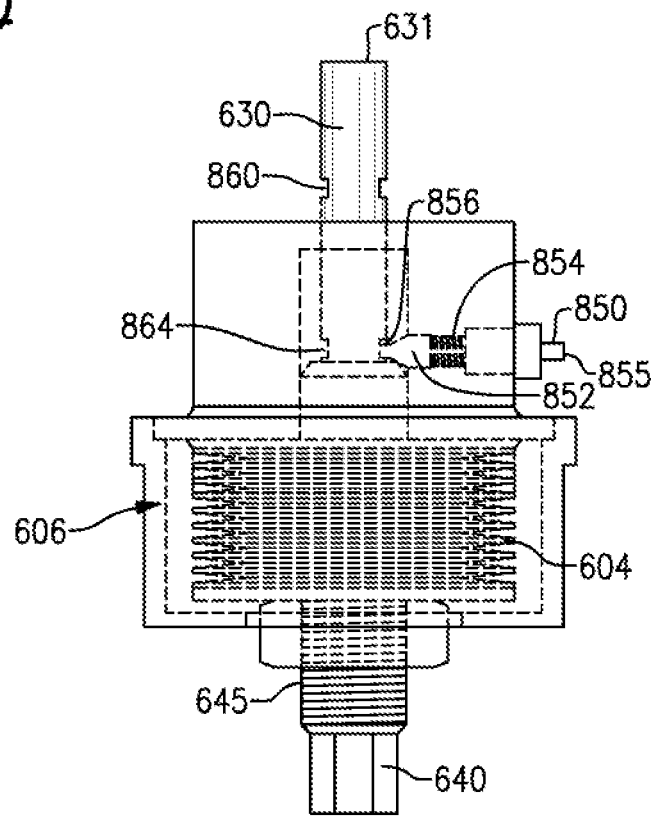

In an initial position, shown in FIGS. 10(a) and 10(b), and when the apparatus 600 is initially mounted in a compartment such as an aircraft engine nacelle, the apparatus 600 is in a normal condition with the distal end 631 of the indicator member 630 essentially flush with a top surface of the housing 606 within the center opening 652 of the fixed upper portion 650. Air is ported from the exterior of the compartment (e.g., atmospheric pressure) through a vent 656 provided in the upper fixed portion 650 of the housing 606. The vent 656 is a channel extending through the thickness of the fixed upper portion 650 and into the lower chamber 610 of the housing 606. Air is similarly ported from within the compartment directly beneath the lower movable plate 620.

A difference in pressure differential in which the interior pressure of the compartment exceeds the exterior pressure by a threshold value (e.g., 3 psid) causes compressive movement of the bellows 604. The bellows 604, acting as a pressure sensitive element, is caused to compress, thereby creating an upward movement of the lower movable plate 620. As the lower movable plate 620 moves upwardly, the adjustment member 640 is also advanced upwardly relative to the fixed upper portion 650. This movement of the adjustment member 640 causes the ball bearings 660 to be dislodged from the necked portion 637 of the indicator member 630 and moved into the annular groove 657 of the fixed upper portion 650. This movement releases the assist spring 612, causing the indicator member 630 to be advanced upwardly under the action of the released assist spring 612 with the distal end 631 of the indicator member 630 extending outward of the housing 606 and the compartment, enabling a visual indication of an overpressure condition.

According to this embodiment and as the indicator member 630 is advanced upwardly, the transverse locking member 670 engages the necked portion 637. The torsion spring 682 biases the locking member 670 and causes the machined flat 678 to engage the necked portion 637, thereby preventing downward movement of the engagement member 630 after release.

The overpressure indicator apparatus 600 can be reset by movement of the indicator member 630 inwardly toward the interior of the housing 604 in combination with accessing the transverse locking member 670, therefore requiring the compartment to first be opened. The locking member 670 is twisted by accessing the proximal end of the locking member 670 with a tool, such as a screwdriver, and rotating the locking member 670 against the bias of the contained torsion spring 682, causing the machined flat 678 to disengage from the necked portion 637. The indicator apparatus 600 can be reset by maintaining the tool on the locking member 670 against the biasing of the contained torsion spring 682 while simultaneously pushing the indicator member 630 inwardly until the ball bearings 660 are again reseated in the necked portion 637 of the indicator member 630, restoring the indicator apparatus 600 to its initial position, as shown in FIGS. 10(a) and (b).

Another version of a reset feature for this indicator apparatus is shown in FIGS. 11(a)-11(d). Similar parts are labeled with the same reference numbers for the sake of clarity. The indicator apparatus 700 includes a housing 606 that receives a pressure sensitive element (e.g. a bellows 604) within a lower chamber 610 formed within the interior of the housing 606. An adjustment member 640 is fixedly and adjustably attached to a lower movable plate 620 by a threaded connection. The adjustment member 640 is defined by an open upper end and an inner hollow cavity retaining an assist spring 612 and an indicator member 630, as previously discussed. One end of the assist spring 612 is coupled to the movable lower plate 620, which further supports the indicator member 630, the latter extending transversely relative to the lower movable plate 620. The indicator member 630 includes a necked portion on an intermediate section that initially retains a set of ball bearings (not shown) until the movable plate 620 has moved a predetermined distance and after a threshold pressure differential between the interior of the compartment and the exterior of the compartment has been exceeded. The dislodging of the ball bearings into the formed groove of the upper fixed portion 650 of the housing 606 releases the assist spring 612 and triggers the assembly 700, causing a distal end 631 of the indicator member 630 to extend outward of the housing 606 and the compartment to which the housing 606 is mounted, indicating an overpressure condition.

The resetting feature includes a locking member 670 similar to that discussed in the previous embodiment defined by a pin having a circular cross section with the exception of a machined flat 678, which extends through a transverse opening formed in the upper fixed portion 650 of the apparatus 700. A latch member 740 is pivotally coupled to the proximal end of the locking member 670. The latch member 740 is defined by an engagement arm 742 engaged by a poppet 746 and a compression spring 750 that biases the latch member 740 in a first position.

In order to reset the indicator apparatus 700, the compartment must first be opened. The latch member 740 is rotated using finger pressure against the engagement arm 742 to rotate the latch member 740 in a clockwise direction against the bias of the compression spring 750. This action causes the attached locking member 670 to be twisted such that the machined flat 678 is released from the necked portion 637 of the indicator member 630. At the same time, the distal end 631 of the indicator member 630 is pushed inwardly. The indicator member 630 can then be moved to its initial position with the assist spring 612 again preloaded in the position shown in FIG. 11(*b*).

Yet another embodiment of a pressure or overpressure indicator or indicator apparatus 800 is shown in FIGS. 12(*a*)-12(*d*). Similar parts are again labeled with the same reference numbers for the sake of clarity. As in the two preceding embodiments, the indicator apparatus 800 includes a housing 606 having an interior. A lower movable plate 620 and upper fixed portion 650 define a lower chamber 610 for retaining a bellows 604, the latter being used as a pressure sensitive element. An adjustment member 640 is threadingly engaged with the movable plate 620 to permit the sensitivity of the bellows 604, as well as the preload of a contained assist spring 612 to be adjusted. The assist spring 612 is disposed within an inner cavity of the adjustment member 640 and disposed in relation with an indicator member 630 disposed above the assist spring 612.

The housing 606 is mounted within a compartment and air exterior from the compartment is vented through the upper fixed portion 650 into the interior of the mounted housing 606. Similarly, air from within the compartment impinges upon the movable plate 620 and bellows 604. If a pressure differential between the interior and exterior of the compartment exceeds a predetermined threshold, the bellows 604 compresses and the movable plate 620 and attached adjustment member 640 are subsequently caused to move upwardly.

In lieu of using ball bearings for triggering the assist spring 612 and releasing the indicator member 630, this indicator apparatus 800 is configured with a pin member 850 that extends into a transverse opening formed in the fixed upper portion 650 of the housing 806. The pin member 850 includes opposing distal and proximal ends 852, 855, respectively. A spring 854 contained in the transverse opening biases the pin member 870 into the center through opening 652 of the fixed upper portion 650 and more specifically within an upper annular groove 860 formed in the indicator member 630. The distal end 852 of the pin member 870 includes a conical end portion 856. According to this embodiment, the distal end 644 of the adjustment member 640 includes a wedge-shaped engagement feature 844.

When the threshold pressure differential is exceeded, the adjustment member 640 is caused to advance upwardly within the center opening 652 of the fixed upper portion 650 until the wedge shaped engagement feature 844 engages the conical end portion 856 of the pin member 870. This movement acts against the bias of the spring 854 to momentarily retract the pin member 850 and releases the assist spring 612, enabling the indicator member 630 to extend to the triggered position shown in FIG. 12(*c*). In the extended or triggered position, the distal end 631 of the indicator member 630 extends outward of the housing 606 and the compartment indicating an overpressure condition. The pin member 850 is again biased into the center opening 652 of the fixed upper portion 650 with the conical end portion 856 engaging a lower annular groove 864 formed in the indicator member 630, creating a stop in the triggered position.

In order to reset the indicator apparatus 800 following an overpressure condition, the compartment must be opened and the proximal end 855 of the pin member 850 must be pulled against the bias of the contained spring 854. While the pin member 850 is pulled from the lower annular groove 864, the indicator member 630 can be pushed inwardly and the pin member 850 can be released to allow the conical portion 856 to be engaged with the upper annular groove 860, restoring the apparatus 800 to its nominal or normal position, as shown in FIG. 12(*b*).

In each embodiment described, the indicator apparatus is preferably attached to the interior wall of the aircraft nacelle compartment in which only the distal end of the indicator member extends outwardly of the compartment. Following the tripping of the indicator member and in each described embodiment, the indicator apparatus cannot be reset without first opening the compartment in order to access the reset or locking member in order to enable the apparatus to revert to its normal position.

PARTS LIST FOR FIGS. 1-12(*d*)

100 compartment
104 interior space or volume
108 exterior, compartment
110 interior wall, compartment
140 overpressure indicator
144 body/housing, indicator
148 indicator feature
200 indicator apparatus
204 body/housing
220 diaphragm, flexible
228 passage
230 magnet
232 passage
234 magnet
240 upper flange
244 mounting holes
246 upper necked portion
248 lower necked portion
250 intermediate portion
260 indicator member
270 reset member
280 spring, biasing 284 spring, biasing
400 indicator apparatus
402 housing
406 bellows
410 lower plate
415 flange
419 upper section
424 passage, venting
425 through opening/cavity
427 top surface
429 mounting holes
430 indicator member
436 recessed portion, indicator member
450 reset member
500 overpressure indicator apparatus
504 bellows
506 housing, indicator
508 inner interior surface, housing
509 lower annular groove
510 lower compartment
511 upper annular groove
512 assist spring
513 top surface, housing
515 downwardly extending flange
519 center opening
521 center opening
523 center opening
518 bottom plate, indicator housing
520 movable interior plate
524 ball bearings
530 indicator member
531 distal end, indicator member
533 proximal end, indicator member
535 intermediate axial portion, indicator member
537 necked portion, indicator member
600 overpressure indicator apparatus
604 bellows
606 housing, indicator
608 interior surface, housing
610 lower compartment
612 assist spring
620 movable lower plate
621 center through opening
630 indicator member
631 distal end, indicator member
633 proximal end, indicator member
637 necked portion
640 adjustment member
642 distal end, adjustment member
644 proximal end, adjustment member
645 external threads, adjustment member
650 fixed upper portion, housing
652 center through opening
656 vent
657 annular groove
660 ball bearings
670 transverse locking or reset member
671 proximal end
673 distal end, transverse locking member
678 flat
682 biasing spring
700 overpressure indicator apparatus
740 latch member
742 engagement arm, latch member
744 poppet
748 spring
800 overpressure indicator apparatus
844 wedge-shaped engagement portions
850 pin member
852 distal end, pin member
854 biasing spring
855 proximal end, pin member
856 conical end portion
860 upper retaining groove, indicator member
864 lower retaining groove, indicator member It should be understood that a number of variations and modifications to the herein described embodiments will be readily apparent to a person of ordinary skill, wherein the descriptions provided are merely intended to be suitable examples and in accordance with the following claims.

The invention claimed is:

1. A passive pressure or overpressure indicator apparatus for use in a compartment of an aircraft engine nacelle, the indicator apparatus comprising:
   a housing configured for attachment within the interior of the compartment of the aircraft engine nacelle;
   a pressure sensing element disposed within the housing, the pressure sensing element having access to the exterior of the compartment via at least one venting passage disposed within the housing in order to detect a pressure differential between the interior and exterior of the compartment wherein the venting passage is configured to meter ambient air to the pressure sensing element;
   an indicator element movably coupled to the pressure sensing element between a nominal position and a triggered position, in which a distal end of the indicator element is caused to move exterior of the compartment in the triggered position to provide a visual indication when a predetermined pressure differential between the interior and the exterior of the compartment indicative of an overpressure condition is detected by the pressure sensing element; and
   a reset mechanism for resetting the indicator element to the nominal position, the reset mechanism including at least one reset feature that can only be accessed by opening the compartment of the aircraft engine nacelle.

2. The pressure or overpressure indicator apparatus according to claim 1, wherein the pressure sensing element is a diaphragm.

3. The pressure or overpressure indicator apparatus according to claim 2, further comprising a pair of magnets disposed on opposing sides of the diaphragm and initially disposed in attraction with one another at a predetermined distance wherein expansion of the diaphragm due to an overpressure condition increases the distance between the magnets and causes a release of the indicator element, thereby moving the indicator element from the nominal position to the triggered position.

4. The pressure or overpressure indicator apparatus according to claim 1, wherein the indicator element is biased by a spring.

5. The pressure or overpressure indicator apparatus according to claim 1, wherein the pressure sensing element is a bellows.

6. The pressure or overpressure indicator apparatus according to claim 5, further including an assist spring used in combination with the bellows to release the indicator element to the triggered position.

7. The pressure or overpressure indicator apparatus according to claim 6, further including at least one feature within the housing configured to release the assist spring when the bellows has moved a predetermined distance due to an overpressure condition.

8. The pressure or overpressure indicator apparatus according to claim 1, wherein the at least one reset feature is disposed transverse to the indicator element.

9. The pressure or overpressure indicator apparatus according to claim 1, in which the at least one venting passage includes at least one restriction to enable vibrational damping.

10. The pressure or overpressure indicator apparatus according to claim 1, in which the at least one reset feature includes at least one transverse pin engageable with the indicator element.

11. The pressure or overpressure indicator apparatus according to claim 1, in which the at least one reset feature includes a latch member.

12. A method for detecting overpressure conditions within a jet aircraft nacelle compartment, the method comprising:
providing a housing with a pressure sensitive element;
connecting an output of the pressure sensitive element to an indicator member movably retained within the housing;
mounting the housing within the nacelle compartment; and
enabling the indicator member to move between a nominal position and a triggered position based on the output of the pressure sensitive element such that an end portion of the indicator member extends external to the compartment in order to provide a visual indication of an overpressure condition when a predetermined pressure differential between the interior and the exterior of the compartment is exceeded as detected by the pressure sensitive element, and wherein the housing includes at least one venting passage extending from the interior to the exterior of the compartment wherein the at least one venting passage is configured to meter ambient air to the pressure sensitive element; and
providing a reset mechanism configured to reset the indicator member to the nominal position following detection of the overpressure condition, the reset mechanism being accessible only by first opening the nacelle compartment.

13. The method according to claim 12, further comprising enabling disposing at least one reset feature of the reset mechanism on the housing within the nacelle compartment.

14. The method according to claim 13, in which the at least one reset feature is one of a pin or a latch member.

15. The method according to claim 12, in which the pressure sensitive element is one of a diaphragm or a bellows.

16. The method according to claim 12, in which the pressure sensitive element is a bellows and in which the method further comprises providing an assist spring to facilitate release of the indicator member to the triggered position when the predetermined pressure differential is exceeded.

17. The method according to claim 12, further comprising:
providing at least one restriction in the at least one venting passage to enable vibrational damping.

* * * * *